(12) United States Patent
Gindele

(10) Patent No.: US 8,311,301 B2
(45) Date of Patent: Nov. 13, 2012

(54) SEGMENTING AN ORGAN IN A MEDICAL DIGITAL IMAGE

(75) Inventor: Edward B. Gindele, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 199 days.

(21) Appl. No.: 12/964,760

(22) Filed: Dec. 10, 2010

(65) Prior Publication Data

US 2012/0148123 A1    Jun. 14, 2012

(51) Int. Cl.
G06K 9/00    (2006.01)
A61B 6/00    (2006.01)

(52) U.S. Cl. ............................ 382/128; 382/255; 378/21
(58) Field of Classification Search .................. 382/100, 382/103, 128, 129, 130, 131, 132, 133, 134, 382/154, 162, 168, 171, 173, 181, 199, 232, 382/254, 255–264, 272, 274, 276, 305, 312; 378/4, 21, 23, 24, 25
See application file for complete search history.

(56) References Cited

U.S. PATENT DOCUMENTS

| | | | | |
|---|---|---|---|---|
| 6,681,054 | B1 * | 1/2004 | Gindele | 382/272 |
| 8,199,981 | B2 * | 6/2012 | Koptenko et al. | 382/128 |
| 2003/0215155 | A1 * | 11/2003 | Serrano et al. | 382/254 |
| 2006/0228009 | A1 * | 10/2006 | Fidrich et al. | 382/128 |
| 2007/0116347 | A1 * | 5/2007 | Hong | 382/131 |
| 2008/0118136 | A1 * | 5/2008 | Cai et al. | 382/131 |

OTHER PUBLICATIONS

J.A. Sethian in *Level Set Methods and Fast Marching Methods*, Cambridge University Press, 1999, Chapter 20, pp. 284-311, ISBN 0 521 64557 3.
Freiman et al., *International Journal of Computer Assisted Radiology and Surgery*, vol. 3, No. 5, Nov. 2008.
Rudin, Osher, and Fatemi, "Nonlinear total variation based noise removal algorithms" published in *Proceedings of the Eleventh Annual International Conference of the Center for Nonlinear Studies on Experimental Mathematics : Computational Issues in Nonlinear Science* (1992), pp. 259-268.
J.A. Sethian in *Level Set Methods and Fast Marching Methods*, Cambridge University Press, 1999, ISBN 0 521 64557 3.

* cited by examiner

*Primary Examiner* — Seyed Azarian

(57) ABSTRACT

A method for obtaining a segmented region corresponding to an anatomical organ in a volume image generates a smoothed image from the volume image and forms a core segmentation of the volume image according to the smoothed image. The size of the core segmentation of the volume image is increased to form the segmented region for the anatomical organ according to data obtained from the core segmentation. Data corresponding to the segmented region is stored in a memory.

19 Claims, 6 Drawing Sheets

SEGMENTING AN ORGAN IN A MEDICAL DIGITAL IMAGE

FIELD OF THE INVENTION

The present invention relates to the field of digital imaging, and more particularly to segmenting an organ in a medical digital image.

BACKGROUND OF THE INVENTION

Image segmentation is a branch of digital image processing that performs the task of categorizing, or classifying, the picture elements of a digital image as belonging or associated with one or more class types. For medical imaging applications, it is common that image segmentation is performed on the voxels (volume element) of a 3-dimensional image data set with the classification types relating to anatomical structure. In thoracic medical images, it is convenient to segment the image voxels into classes such as bone, lung parenchyma, soft tissue, bronchial vessels, blood vessels, etc. There are many reasons to perform such a task, such as surgical planning, treatment progress, and patient diagnosis.

Of particular interest is the image segmentation approach generally known as region growing. Starting with a seed point, i.e., a voxel position that is known to be part of a particular class type, a region of voxels, often contiguous in nature, is grown or otherwise developed about the seed point. The region growing process progresses until a terminating condition is satisfied, e.g., no more voxels that meet suitable criteria are found, or a predetermined number of voxels have been visited, etc.

Conventional segmentation approaches that begin with a seed point can work acceptably for some types of organ segmentation problems. However, because of its relatively complex tissue structure, the liver can be difficult to segment with conventional approaches.

One conventional technique is described in a paper entitled "An iterative Bayesian approach for nearly automatic liver segmentation: algorithm and validation" in *International Journal of Computer Assisted Radiology and Surgery*, Volume 3, Number 5, November 2008 by Freiman et al. These authors describe an algorithm for segmenting the liver organ in thoracic CT (computed tomography) medical volume images. This algorithm starts with the user of a PACS (Picture Archive and Communication System) supplying a seed point within the liver organ, within a displayed axial slice of a thoracic CT volume image. The automated processing includes performing a voxel value based classification step to define a first segmentation map. A series of morphological operations are performed on the first segmentation map to produce a modified segmentation map. A geodesic active contour algorithm is used to process the modified segmentation map to produce a final liver organ segmentation map.

In the method described by Freiman et al., the seed point, supplied by the user, is used to sample the local voxel values within a rectangular region about the seed point to determine the intensity range of values that correspond to the liver organ. The range of voxel value intensities corresponding to the liver organ are determined by assuming a generally Gaussian distribution of pixel or voxel values and then using the calculated mean and variance from the sampled region. The intensity range of values is then used to threshold the volume image and to produce a probability map, i.e. a map with values ranging from 0.0 to 1.0 that indicate the likelihood that the voxel belongs to the liver organ. Next, the probability map is spatially smoothed using a Maximum A Priori rule to produce the first segmentation map. The morphological operations that are applied include performing a largest connected components operation followed by hole filing and a morphological opening operation. The entire procedure described above is performed in a multi-resolution framework by operating on the lowest resolution component first and finishing with the highest resolution component.

The method described by Freiman et al. is used when the liver organ tissue is fairly homogeneous and is well differentiated from the surrounding background tissue in terms of voxel value. In practice, however, this is generally not the case. Instead, it has been found that noise levels in the CT image often make this type of approach unusable. Noise in a typical CT volume image can be similar in magnitude, i.e. standard deviation, to the expected difference in mean value from the liver organ tissue to the mean value of the background tissue. Where this is the case and the obtained volume image data representing the liver therefore fails to have a well-behaved Gaussian distribution, the method described by Freiman et al., yields disappointing results. Typically, such an algorithm tends to over-segment the liver, i.e. the final liver organ segmentation map includes substantial regions of non-liver tissue of the surrounding background.

Attempts to compensate for noise in the CT image do not appear to help the performance of the Freiman et al. approach. For example, the method described by Freiman et al. can be combined with a method described by Rudin, Osher, and Fatemi in the article "Nonlinear total variation based noise removal algorithms" published in *Proceedings of the Eleventh Annual International Conference of the Center for Nonlinear Studies on Experimental Mathematics: Computational Issues in Nonlinear Science* (1992), pp. 259-268. The noise removal algorithm (ROF filter) described by Rudin et al. is an iterative approach that removes variation, stochastic or structural, by successively iterating an energy minimization quantity. The ROF filter is designed to remove image variation, be it stochastically induced (noise) or structural in nature (relating to organ and tissue morphology). The ROF filter can be applied first to a volume image to remove the effects of noise, resulting in a noise filtered volume image. This noise filtered volume image can then be operated on by the Freiman algorithm to produce a liver organ segmentation map.

In practice, because boundaries between the liver and surrounding tissue can be fairly subtle in many cases, application of this combined approach using initial noise filtering with an ROF filter has not produced satisfactory results. Instead, the ROF filter often spatially smoothes one or more of the subtle boundaries between the liver and muscle tissues, between liver and spleen tissue, between liver and heart tissues, and between liver and stomach tissues. As a consequence, the resulting liver segmentation maps produced with the above mentioned combination approach can be over-segmented, often including substantial regions of non-liver tissue.

In general, typical imaging processing algorithms for segmentation of the liver and other organs in CT exam images show improved performance when a contrast agent has been administered to the patient. The contrast agent, applied within the blood stream, tends to augment the voxel value differences between anatomical structures. As a general rule, the greater the voxel difference between an organ and its surrounding background, the better the resulting organ segmentation when using conventional segmentation algorithms. In the case of the liver organ, high levels of contrast agent help to differentiate between healthy liver parenchyma tissue and unhealthy tissue. For these cases, the organ segmentation task is complicated. However, most conventional liver organ segmentation algorithms are not suitable for CT exams in cases where no contrast agent had been administered to the patient, due to the inherently poor liver-to-background voxel difference. In practice, the liver-to-background voxel differences can even be smaller than the noise magnitude present in the CT image data itself.

Thus, it can be appreciated that there is a need for an improved image processing method for segmentation of the liver and other organs.

SUMMARY OF THE INVENTION

It is an object of the present invention to address the need for an improved segmentation method for the liver and other anatomical organs for diagnostic imaging applications.

A further object of the present invention is to provide a segmentation method that does not rely on contrast agents.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to aspects of the present invention, there is provided a method for obtaining a segmented region corresponding to an anatomical organ in a volume image, the method comprising: generating a smoothed image from the volume image; forming a core segmentation of the volume image according to the smoothed image; increasing the size of the core segmentation of the volume image to form the segmented region for the anatomical organ according to data obtained from the core segmentation; and storing data corresponding to the segmented region in a memory.

According to alternate aspects of the present invention, there is provided a method of segmenting a region corresponding to an anatomical organ of interest in a volume image, the method comprising: receiving a starting point within the volume image and corresponding to a location within the anatomical organ; generating a smoothed image by spatially filtering the volume image; segmenting a core region within the smoothed image based on a predetermined smoothness threshold criterion, wherein the core region includes the starting point; obtaining a low characteristic value and a high characteristic value according to the range of values within the core region; generating an expanded segmented region corresponding to the anatomical organ of interest by expanding the core region according to voxel values within the range defined by the obtained low and high characteristic values; and presenting the expanded segmented region of the anatomical organ of interest on a display.

DETAILED DESCRIPTION OF THE INVENTION

Figure 1:
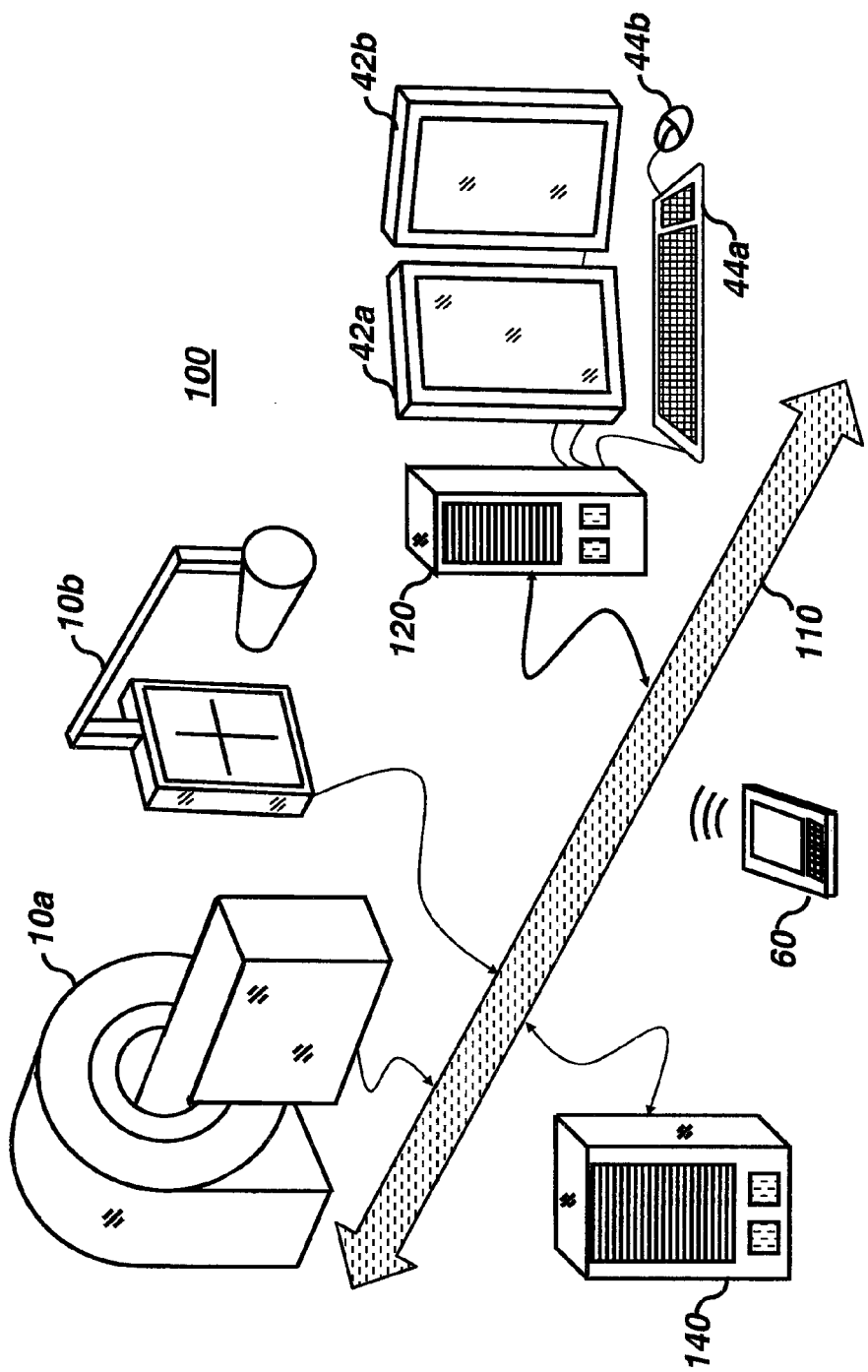
FIG. 1 is a diagram showing a medical imaging communications network of connected computers suitable for practicing the present invention.

Many medical imaging applications are implemented via a picture archiving and communications systems (PACS). These systems provide a way for displaying digital images acquired using a wide variety of medical imaging modalities such as, but not limited to, projection radiography (x-ray images), computed tomography (CT images), ultrasound (US images), and magnetic resonance (MR images). Each of the above mentioned medical imaging modalities contain slightly different diagnostic information. In particular, CT and MR images when viewed and studied by a radiologist, can reveal much detail about a patient's 3-dimensional internal anatomy. To enhance the rendering of diagnostic information, computer algorithm technology can also be applied to the medical image data. This can help to detect an abnormal condition, i.e., using computer aided detection (CAD), and can help to make measurements relating to the patient's condition, i.e., computer aided measurement (CAM).

The present invention represents an algorithmic computer method for segmenting a portion of a medical image with anatomical relevance. In particular, the primary motivation for the development of the technology described herein is the segmentation of organ tissue from background tissue. An intended use for the technology described herein is as follows. A radiologist reviews a thoracic CT exam on a medical PACS and indicates to the CAM segmentation software the position of an organ of interest. The voxel position indicated represents a seed point or starting point assumed to be part of the organ of interest. The CAM segmentation software then identifies voxels surrounding and contiguous with the seed point that are part of the organ of interest. Once the region associated with the organ of interest has been segmented, a corresponding volumetric size can be readily calculated. This information can help in patient diagnosis and treatment since changes in liver volume can be used to assess patient health. The particular advancement of the present invention relates to methods of performing the image segmentation task.

In the following description, a preferred embodiment of the present invention will be described as a software program. Those skilled in the art will readily recognize that the equivalent of such software can also be constructed, in whole or in part, in hardware. Since image processing and manipulation algorithms and systems are well known, the present description will be directed in particular to algorithms and systems forming part of, or cooperating more directly with, the method in accordance with the present invention. Other aspects of such algorithms and systems, and hardware and software for producing and otherwise processing the image signals involved therewith, not specifically shown or described herein, can be selected form such systems, algorithms, components, and elements known in the art. Given the description as set forth in the following specification, implementation can use conventional software and techniques known to those skilled in the programming arts.

In the context of the present disclosure, the term "volume image" is synonymous with the terms "3-dimensional image" or "3-D image". The present invention, although developed primarily for the use of segmenting the liver organ in CT volume images, also yields good results for segmentation of other organs, such as the gall bladder and spleen, for example. It should also be noted that, although the technology of the present invention was developed for use with 3-D image data, those skilled in the art will recognize that it is applicable to 2-D image sets as well.

Difficulties with Liver Segmentation

For a better understanding of how the method of the present invention achieves successful segmentation of the liver region within a volume image, it is instructive to first consider some of the complexities of liver segmentation and some of the shortfalls of conventional segmentation methods.

For liver CT studies, a contrast agent is typically injected into the patient in order to help differentiate the liver parenchyma from other anatomical structures. In CT liver studies, the patient can be imaged multiple times resulting in three or four individual volume images. The first volume image captured is performed prior to injection of the contrast agent. This first captured image is referred to as the no-contrast volume image. A fluid contrast agent is then injected intravenously and a second image is captured at a later time—typically delayed by about a minute. The delay is necessary for the contrast agent to work its way through the patient's arterial system. This second captured image is referred to as the arterial volume image. A third image is captured after another delay and the contrast agent has had enough time to work its way into the hepatic veins. This third image is referred to as the venal volume image. Additionally, there can be other images captured at varying delay times. These additional captured images are referred to as washout volume images.

Liver lesions can be categorized as hypo-dense or hyper-dense with regard to radio opacity of the lesion relative to the liver parenchyma. Hypo-dense liver lesions appear darker (less x-ray opacity) than liver parenchyma while hyper-dense lesions appear lighter (more x-ray opacity). The use of a contrast agent for liver CT studies is primarily motivated by the differentiation of the liver lesions from the liver parenchyma (healthy liver tissue). In addition, the vascular structure (more x-ray opacity) within the liver is also differentiated from the liver parenchyma. The present invention can be used to segment the liver organ for any of the types of captured CT liver images, i.e. the arterial, venal, washout and no-contrast volume images. In fact, it has been found that methods of the present invention often actually perform better on no-contrast images than on the images captured with contrast agent. This result is counter-intuitive and unexpected.

The liver is, arguably, one of the most difficult organs in the human body to segment automatically or manually. This is primarily due to the manner in which the liver organ initially grows. While most organs have a reasonably well defined characteristic shape, e.g. kidney, the liver grows, in part, to fill the available space in the abdominal cavity. As such, the shape of the liver organ is highly variable. A further complicating factor for segmentation relates to resection. Liver cancer is a common form of cancer, since a high percentage of liver cancer is metastatic. Therefore, a fair percentage of patients have a portion of their liver resected (removed by surgery). The resultant shape of the resected liver can be very different from its initial shape. In general, the shape of the liver organ is smooth in the region where it contacts the diaphragm (distal surface) and convoluted for the medial surface portions.

Unlike some conventional segmentation techniques, the present invention does not use any liver specific shape information to segment the liver organ. It relies, instead, on the relatively homogenous nature of the organ but deals more effectively with changes in tissue texture and noise than do earlier segmentation approaches.

The liver organ regions of captured CT volume images are, in general, far from homogeneous. Noise is one factor that corrupts the images, but the addition of a contrast agent also serves to make regions of the liver organ inhomogeneous with respect to voxel values. As described in more detail subsequently, lesions (cancerous or benign), arteries, and veins are differentiated from the liver parenchyma tissue. However, the liver parenchyma, i.e., the healthy liver tissue, is also inhomogeneous in the absence of noise. Each different section of the liver (canonically 8 or 9 sections) accepts the contrast agent differently. This can be clearly seen on some CT volume images as a mean shift in the voxel values with a visible boundary between two different sections. In noisy images, the boundary between liver sections can be difficult to detect visually.

A system suitable for practicing the present invention is illustrated in FIG. 1 showing a medical imaging communications network 100 that includes multiple connected computers. Such a network of computers provides a way of sending and receiving information between any two or more connected computers. Medical digital images are generated by imaging a patient (not shown) with a capture device of a particular modality. An image capture device 10a symbolically represents a number of medical digital image modality devices such as, but not limited to, a computed tomography scanning device (CT) or Magnetic Resonance imaging scanning device (MR), both capable of producing 3-dimensional or volume digital images of patient anatomy.

For volume imaging, a patient is positioned on a movable table within the capture device assembly such that the patient can be moved relative to the signal source of the capture device. The capture device receives the signals that have passed through the patient in raw form, processes these signals, and produces a slice digital image. Each slice digital image represents a single cross-sectional, or slice, through the patient anatomy. A slice image series can be generated by successively repositioning the patient relative to the source signal and acquiring other slice digital images relating to different cross-sections through the patient. A slice image series, assembled in proper order, can then be used to represent the full 3-dimensional volume of an imaged patient.

Also connected to a communications network 110 is a digital radiographic (DR) capture device 10b capable of producing digital x-ray images. As such, the images typically produced by a DR capture device are one or more 2-dimensional digital images each representing a different exposure and/or imaging path through the patient. For example, the DR capture device 10b can be used to acquire multiple projection radiographic digital images, with the x-ray source located in a different position relative to the patient for each image. The resulting DR radiographic digital images can be processed to produce a set of tomosynthesis slice digital images that represent a 3-dimensional digital image of the patient.

The slice digital images (not shown) produced by the capture device 10a are transmitted via the communications network 110 to an image archive computer 140 where, along with patient history information, they become part of an electronic patient history record stored in memory. The main function performed by the image archive computer 140 is the facilitation of transfer or exchange of image information rather than the processing of information. The image archive computer 140 serves as a large storage repository of digital images and other unspecified medical information. The arrows in the diagram of FIG. 1 represent the exchange of information, which in general, is bi-directional i.e.; the flow of information can be in either direction.

The stored slice images are later queried on a diagnostic workstation computer 120, sometimes referred to as a PACS (Picture Archive and Communication System), for viewing and examination by a radiologist or similarly trained medical professional. The diagnostic workstation computer 120 or other type of host processor can have multiple electronic displays connected for viewing medical images. Two such electronic display devices 42a and 42b are shown in FIG. 1. Each display device has a corresponding display buffer that serves as a type of memory for storing the image data that currently displays. This display buffer is provided by workstation computer 120 in one embodiment. Also connected to the diagnostic workstation computer 120 are input devices 44a and 44b depicted here as keyboard and mouse devices respectively. Although the technology of the present invention can be envisioned as operating within the context of a diagnostic workstation computer, it should be noted that any computing device capable of displaying and processing image data can be used. As one example, a mobile computer 60 shown in FIG. 1 can be used with the present invention. Thus, it is not necessary for the computer to be physically connected to the communications network 110.

A PACS (Picture Archive and Communication System) can be defined as a system that acquires, transmits, stores, retrieves, and displays digital images and related patient information from a variety of imaging sources and communicates the information over a network. By this definition, the diagnostic workstation computer 120 shown in FIG. 1 can represent a PACS. Similarly, the combination of the diagnostic workstation computer 120, mobile computer 60, image archive computer 140, and communication network 110 can collectively be considered a PACS. In addition to the patient digital images, PACS transmit, receive, and store other electronic patient record information such as, but not limited to, non-image information (meta-data) such as age, sex, medical history, prescribed medications, symptoms, etc.

For the purposes of the discussion of the present invention, the collection of inter-connected computers including the communications network will be also be referred to as a DICOM network (Digital Imaging and Communications in Medicine PS 3.3-1999, National Electrical Manufacturers Association, 1999), since DICOM-formatted digital images are currently the industry standard and the most prevalent file encoding used for medical digital images. Typically, a 3-dimensional volume image is constructed from a set of 2-dimensional slice digital images, wherein each slice digital image is encoded as an individual DICOM file.

Typically, an individual digital image data element, i.e., single value representing a measured image signal intensity, is referred to as a voxel for 3-dimensional volume images and a pixel for 2-dimensional images. The term voxel is commonly used to characterize a volume-element whereas the term pixel is commonly used to characterize a picture-element. The approach of the present invention can be applied to 2-dimensional as well as 3-dimensional images. As such, for the purposes of the description herein, the terms voxel and pixel should be considered interchangeable, i.e., describing an image elemental datum that is capable of having a range of numerical values. Voxels and pixels can be said to have the attributes of both location and value.

It should be noted that the term "memory", equivalent to "computer-accessible memory" in the context of the present disclosure, can refer to any type of temporary or more enduring data storage workspace used for storing and operating upon image data and accessible to a computer system. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types. With respect to communications network 110 shown in FIG. 1, computer-accessible memory of various types is provided on different components throughout the system for storing, processing, transferring, and displaying data, and for other functions.

With the medical imaging system setup as described above and shown in FIG. 1, a medical professional such as a radiologist (not shown), uses the keyboard 44a or mouse 44b to indicate, to a software application program 150 (shown in FIG. 2) running on the diagnostic workstation computer 120, the desired patient record (not shown) to be loaded into memory. The CT digital image exam, i.e., the set of CT slice digital images, is then retrieved from the image archive computer 140 and displayed on the electronic display devices 42a and 42b. After viewing the image data, the medical professional indicates to the system the location of a suspected pulmonary lesion with a click of the mouse, input device 44b, or other suitable pointing device. Typically the viewing operation is performed by scrolling through the 2-dimensional slice digital images, one at a time, and viewing the slice digital image that best shows the suspected pulmonary lesion.

In brief, embodiments of the present invention provide a method for automatically obtaining a segmented region corresponding to a liver or other anatomical organ in a volume image. The method initially generates a smoothed image from the volume image, with or without a seed point indicated, then forms a core segmentation of the volume image according to the smoothed image. The core segmentation that has been generated includes voxels that have a high probability of belonging to the liver or other anatomical organ of interest. The size of the core segmentation of the volume image is then increased in order to form the segmented region for the liver or other anatomical organ according to data obtained from the core segmentation. The resulting segmented region is then displayed.

Figure 2:
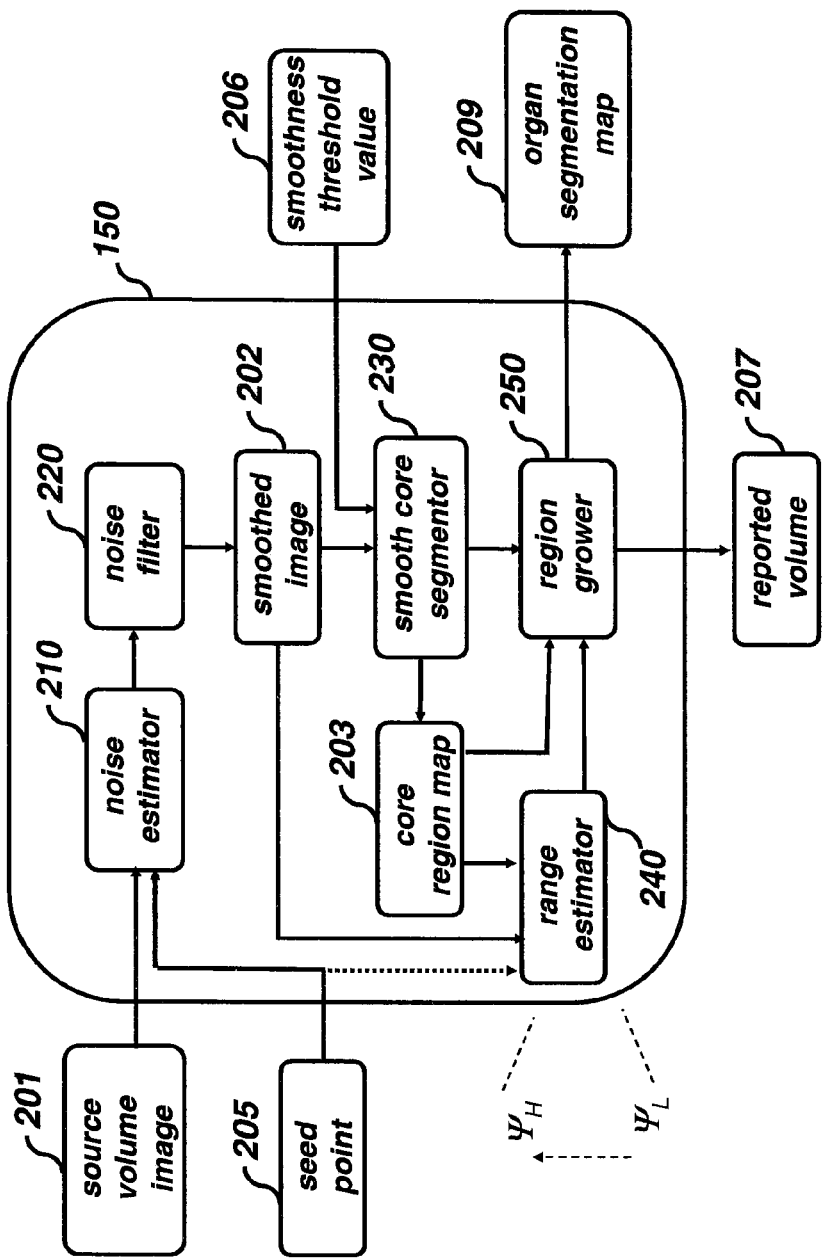
FIG. 2 is block diagram showing the details of the software program running within the diagnostic workstation computer.

An overview of the flow of image information into, out of, and within a software application program 150 that executes organ segmentation on diagnostic workstation computer 120 of FIG. 1 is depicted in FIG. 2. The software application program 150 receives a set of source digital images in the form of axial CT slices that constitutes a source volume image 201, a seed point 205, and a smoothness threshold value 206 as input. In one embodiment, the user of the system supplies the seed point 205 after reviewing the source volume image 201 and selects a point within the liver or other organ-of-interest. The noise estimator 210 receives the source volume image 201 and the seed point 205, samples the values within a domain about the seed point 205, calculates a value for the expected noise magnitude corresponding to the organ of interest and sends this estimate of noise magnitude and the source volume image 201 to the noise filter 220. The noise filter 220 uses the expected noise magnitude value and the source volume image 201 to generate smoothed image 202. The main purpose of the noise filter 220 is to reduce or, if possible, remove all traces of the stochastic components of variation in the source volume image 201 and some image texture as well. The smoothed image 202 is received by the smooth core segmentor 230 and produces a core region map 203. The task it performs is regulated by the received smoothness threshold value 206. The core region map 203 represents a region that usually includes the core, or central, region of the intended organ-of-interest, also termed a first segmentation. The core region map 203 is received by the range estimator 240 that calculates a high and low characteristic value by sampling the values of the smoothed image 202 within the domain indicated by the core region map 203 that corresponds to the organ-of-interest. The region grower 250 receives the core region map 203 and the high and low characteristic values and produces an organ segmentation map 209 that is stored in memory and provides an expanded segmentation. It also uses the organ segmentation map 209 to calculate the corresponding reported volume 207 (typically in cubic mm) for the organ-of-interest.

Noise Estimator 210 Function

The noise in CT images varies depending on factors such as the x-ray radiation dose given the patient during image capture and size of the patient. In the process flow of FIG. 2, noise estimator 210 calculates a value as the estimate of the noise magnitude in a volume image in the vicinity of the seed point 205. A predetermined sized volume sampling region is centered about the seed point 205. Through experimentation, it has been found that good results can be obtained by using a region corresponding to 50 mm by 50 mm in the XY plane and 15 mm in the Z direction. The noise magnitude estimate is calculated by calculating the difference between the value of the voxel of interest and a voxel value located a lag distance away from the voxel of interest. The direction of the lag is chosen, for convenience, to be in the X direction. The lag distance is chosen as two voxel units away. The difference value is calculated for all voxels within the predetermined volume sampling region. The noise magnitude estimate is calculated as the mean of the absolute value of the sampled difference values. This figure of merit is a surrogate for calculating the standard deviation of the noise magnitude. The present invention will work with other methods of estimating the noise magnitude such as calculating the standard deviation of values directly. The main advantage of using the average of absolute value differences approach, versus calculating the standard deviation of voxel values directly, is in not having to calculate the mean value of the local region. Lag distances other than two will also yield acceptable results.

In the processing shown in FIG. 2, a significant function of the noise estimator 210 is to produce a usable estimate of the stochastic variation in the source volume image 201. The present invention can alternately be used with other methods designed to estimate image noise magnitude such as the method disclosed in U.S. Patent Application No. 2003/0215155, entitled "Calculating noise estimates of a digital image using gradient analysis" by Navid et al., for example.

Noise Filter 220 Function

One advantageous aspect of the present invention is that acceptable organ segmentation results can be produced even with extremely noisy starting images. The noise filter 220 iteratively applies a noise reduction algorithm to the source volume image 201, using spatial filtering to effect a reduction in stochastic variation in the processed image, i.e. the smoothed image 202. An embodiment of the present invention uses the noise reduction algorithm described in U.S. Pat. No. 6,681,054 entitled "Noise reduction method utilizing probabilistic weighting, apparatus, and program for digital image processing" to Gindele. In summary, for a given voxel of interest, a noise-free voxel estimate is calculated by first calculating an estimate value for each of four local regions about the voxel of interest within a particular plane. These regions are 3 by 1 voxels in size and are oriented, within the plane, in four different directions: one horizontal, one vertical, one at plus 45 degrees, and one at minus 45 degrees. Each of the four local regions includes the voxel of interest. The median value of each of these four local regions is calculated to form the four estimate values. The value of the voxel of interest forms a fifth estimate value. A weighted average of the five estimate values forms the final noise-free estimate value for the voxel of interest. The weighted average of the five estimate values is performed by a Gaussian weighting function wherein the standard deviation of the Gaussian function is given by a multiple ($\lambda$) of the noise magnitude estimate. A suitable value for the parameter $\lambda$ is 5.0. This procedure is performed on each voxel in the source volume image 201 wherein the voxel values of the smoothed image 202 are formed from the noise-free estimate values.

The noise reduction algorithm described above and used to generate smoothed image 202 in FIG. 2 is a 2-dimensional algorithm, i.e., it is applied to a 2-dimensional image. However, the organ-of-interest is a 3-dimensional object. Although the above-described noise reduction algorithm can easily be extended to three dimensions, the present invention uses the computationally efficient implementation of the 2-dimension noise reduction algorithm in a successive manner to achieve the reduction of noise. In particular, the 2-dimensional noise reduction algorithm is first applied to each of the axial slices (XY-plane slices of the source volume image 201). Optionally, the noise reduction algorithm is then applied to each of the coronal slices (XZ plane slices of the source volume image 201) and then optionally to the sagittal slices (YZ plane slices of the source volume image 201). Typically with the $\lambda$ parameter set to 5.0, the resulting stochastic variability in the smoothed image 202 is about 40% less than in the source volume image 201. On visual inspection, the smoothed image 202 retains almost all of the structural edge content of the source volume image 201 but has significantly less noise. The three-step processing of axial, coronal, and sagittal filtering is considered a single pass of the noise reduction algorithm. It should be noted that within one pass of the noise reduction algorithm, any one of the three applications of the noise reduction algorithm can be omitted. For example, just the axial planes can be processed or just the axial and coronal planes can be processed and still yield acceptable noise filtration.

Iterative Processing for Noise Reduction Algorithm

In general, for good performance of organ segmentation, it is often necessary to perform more than one pass of the noise reduction algorithm. Typically, five passes of the noise reduction algorithm provide a smooth enough image to yield good segmentation results. In this regard, the present invention produces smoothed images 202 that have had more than just the noise in the original image removed. In fact, after five passes, the resulting smoothed image 202 also has some structural anatomy removed as well as noise content. For the case of segmenting the liver organ, it has been found that the segmentation processing actually works best if the structural edges corresponding to the veins and arteries within the liver organ are suppressed or removed by the noise filtering operation.

The inherent noise magnitude in the source volume image 201 is typically on the order of 15 to 20 HU standard deviation for a typical CT thoracic study. However, for low-dose CT studies, the standard deviation of the noise can be 50 HU or higher. As an alternative to processing a fixed number of times, such as executing 5 successive passes or iterations of the above noise reduction algorithm, the number of passes of the noise filtering operation can be made variable. For this implementation of the present invention, the noise estimator 210 is employed after each pass of the noise reduction algorithm. When the measured noise estimate (estimated standard deviation) that is sampled from the smoothed image 202 falls below a pre-determined threshold ($\epsilon$), the noise filtering is stopped. This last noise estimate, lying just below the threshold value, is referred to as the residual noise estimation value. A suitable value for the parameter $\epsilon$ is between 1.0 HU and 2.0 HU. This condition works well for segmenting the liver organ. When segmenting other organs that have inherently smooth interior structure, as compared with the liver organ, a higher value of ϵ will provide excellent segmentation results. For example, when segmenting the spleen organ or gall bladder organ, a value of 5.0 HU can be used.

Experimentation confirmed that the present invention can yield good organ segmentation results when using other noise filters. In particular, good segmentation results were obtained by obtaining smoothed image 202 using the noise reduction algorithm disclosed by Rudin, Osher, and Fatemi in the article "Nonlinear total variation based noise removal algorithms" published in *Proceedings of the eleventh annual international conference of the Center for Nonlinear Studies on Experimental mathematics: computational issues in nonlinear science* (1992), pp. 259-268.

As was noted earlier, contrast agents are often used when imaging the liver and can serve as an aid to liver segmentation when using conventional segmentation techniques. Because of the inherent difficulties in identifying liver tissue, conventional segmentation techniques have been shown to be less successful where no contrast agents are used.

By comparison, the present invention, when applied to no-contrast volume images (that is, to images in which there is substantially no visibly perceptible trace of contrast agent), performs very well. For these captured volume images, the lesions (hypo-dense and hyper-dense) are often very difficult for observers to see, since their mean voxel values are very close to the voxel value for the liver parenchyma. For some liver exam CT data, the lesions can be differentiated from the liver parenchyma tissue by less than 6 HU. Some no-contrast volume images have a parenchyma-to-lesion mean voxel value difference of as much as 15 HU. The application of the noise reduction algorithm servers to smooth out the subtle variations of the component tissue parts of the liver organ for no-contrast volume images. After noise filtering, the magnitude of the variation within the component regions is very low, i.e. the lesion and parenchyma tissue regions. However, the difference in mean voxel value between component regions remains.

The present invention, when applied to contrast-aided volume images, that is, to CT volume images captured following the injection of a contrast agent, usually performs well with regard to segmentation of the liver organ region. However, if the contrast agent uptake in the liver is particularly high, the difference in voxel value between the liver parenchyma and hypo-dense lesions can be 70 HU or greater. This difference can be great enough so that only the liver parenchyma is segmented and not the regions corresponding to hypo-dense lesions. For these cases, the estimate of liver volumetric size can be less than the actual size of the liver organ.

Contrast-aided volume images, i.e. the arterial volume images and the venal volume images, have much higher voxel differences between the lesion and parenchyma tissue regions as compared with the washout volume images and no-contrast images. For some images the mean voxel differences can be in the range of 60 to 70 HU. In general, the present invention works best for organs, or objects, within volume images where the object to be segmented has less inherent combination of stochastic and structural variability. Some liver organs within contrast-volume images yield good segmentation results with the present invention. As noted previously, however, an even higher percentage of good segmentation results are achieved with no-contrast volume images.

Improved segmentation results can be obtained with the technology of the present invention if the noise filtering parameter λ is adjusted on the basis of the level of contrast agent that is administered to the patient being imaged. Alternatively, the number of passes of the noise filtering operation 220 in FIG. 2 can be adjusted on the basis of the level of contrast agent. Consequently, the value of the noise filtering parameter λ should be higher for the arterial and venal volume images and less for the no-contrast and washout volume images as part of a contrast agent administered organ examination. The value of λ should be roughly one half for the no-contrast volume images as the value used for the arterial volume images. Alternatively, the method described above, wherein the noise filtering is successively performed until the calculated noise estimation magnitude falls to within a value ϵ, will also work to increase the degree of noise filtration in response to the voxel variation induced by the contrast agent. The method of varying the parameter λ with a fixed number of noise filtering operations and the method of varying the number of noise filter operations until the measured variability falls to a prescribed value are both examples of varying the noise filtering operation in response to the level of contrast agent administered to the patient.

Smooth Core Segmentor 230

Referring back to FIG. 2, the next step in processing is performed by the smooth core segmentor 230. A key aspect of the operation of the smooth core segmentor 230 is the differentiation, or segmentation, of the region that is spatially smooth in the proximity of the seed point 205. The smooth core segmentor 230 applies a spatial smoothness criterion to the voxels of the smoothed image 202 resulting in a core region, represented as a core region map 203. There are a number of possible smoothness criterion operators that can be applied to an input image. One embodiment of the present invention uses a spatial operator that calculates the minimum and maximum voxel values within a prescribed region about a voxel of interest. That is, for a 3 by 3 by 3 voxel region about a voxel of interest, the minimum and maximum voxel values are recorded. The difference between the maximum value and the minimum value represents a relative degree of smoothness, that is, of spatial activity, for the voxel of interest. This smoothness difference value is then compared to a predetermined smoothness threshold value Δ that is empirically determined. Voxels with a calculated smoothness difference value less than or equal to smoothness threshold Δ are considered as "spatially smooth" and are included in the core region map 203. If this criterion is not met, the voxel is considered to lie outside the core region map 203.

The present invention can be practiced with other methods for calculating and applying a smoothness criterion. Alternatively, for example, the local spatial gradient can be calculated about the voxel of interest. The absolute value of the calculated spatial gradient can then be compared to the predetermined smoothness threshold value Δ to produce the core region map 203.

Seed Point not within the Core Region

The core region map 203 as described with reference to FIG. 2 may or may not include the seed point 205 previously indicated by a viewer. It is an important aspect of the present invention that the saved spatially smooth region identified in the core region map 203 correspond to the user's intent. Recall that the user typically supplies the seed point 205 to indicate the organ, and region, of interest. When the application of smoothness criterion, as described above, results in a core region map 203 that does not include the seed point 203, the location of the seed point is relocated to the location within the core region map 203 that is geometrically closest to the original seed point. This new seed point is also referred to as seed point 205. Thus after this seed point relocation processing, seed point 205 is guaranteed to be within the core region map 203.

Morphological Operations

The operation of the smooth core segmentor 230 described above can optionally be enhanced by applying morphological operations to the core region map 203. In particular, an erosion operation can be used to break the connectedness of the core region map 203 with non-organ tissue regions. In one embodiment, erosion is performed with a morphological kernel element that is approximately 13 voxels in diameter.

The resulting map from an erosion operation is smaller than the original region map 203. Much of the region lost to the erosion operation can be regained with a subsequent constrained dilation operation. In this operation, the region map in process is dilated with a morphological kernel element approximately 19 voxels in diameter. A constraint is placed on the dilation operation, so that no voxels can be added to the final core region map unless those same voxels were contained within the original core region map 203. The net effect of the erosion/constrained dilation operations is to break the connection between the core region map and tissue that lies outside of the organ of interest, while maintaining most of the organ-of-interest tissue of the original core region map.

Range Estimation

The purpose of the range estimator 240 in the process of FIG. 2 is the calculation of two voxel values, a high characteristic value $\Psi_H$ and a low characteristic value $\Psi_L$ that represent the range of voxel values corresponding to the organ-of-interest. Both characteristic values are sampled from the smoothed image 202 within the region defined by the core region map 203 as follows. The extreme values are found (maximum and minimum) and a range-stretching value is added to and subtracted from the maximum and minimum, respectively, to produce the respective high characteristic value and low characteristic value. Thus the high characteristic value $\Psi_H$ is given by the maximum plus $\Omega_H$ and the low characteristic value $\Psi_L$ is given by the minimum minus $\Omega_L$. The value of the parameters $\Omega_H$ and $\Omega_L$ accounts for the inclusion of voxels that are slightly outside the range of voxel values identified by the minimum and maximum, to account for some voxel value variability. Although various positive and negative values for $\Omega$ can be used to obtain acceptable results, the optimum values for $\Omega_H$ and $\Omega_L$ were found experimentally to be 3 and 15 respectively.

Region Growing

The region grower 250 in the process of FIG. 2 uses the range defined between $\Psi_H$ and $\Psi_L$ as one of the criteria to produce an organ segmentation map 209. Another criterion that is used relates to the geodesic distance of voxels from the core region map 203. Referring to the 2-D representation in FIG. 3, an example first segmentation is shown by the locus of points contained within the dotted line of core region map 303 and with a starting point 310. The corresponding organ segmentation map 309 is generated with an expanded segmentation region, all voxels within the boundary indicated by the solid line indicating organ segmentation map 309 are part of the expanded segmentation that is obtained by region growing, beginning from the first segmentation, core region map 303. Location 305 represents a zone, or local region of voxels, where the voxel values of the smoothed image 202 (not shown in FIG. 3) have values bounded by $\Psi_H$ and $\Psi_L$ are also within a propagation distance $\Gamma$ (shown as line 304) of the core region map 303. Location 307 corresponds to a zone where the voxel values of the smoothed image 202 that lie outside the core region map 303 are not bounded by $\Psi_H$ and $\Psi_L$ but lie within the specified criterion propagation distance $\Gamma$. Experimentation with liver organ segmentation examples has shown that an optimal value for the predetermined propagation distance $\Gamma$ is 4 voxels. However, acceptable results were obtained with other values of $\Gamma$ as high has 10. For organs other than the liver, the value of distance $\Gamma$ can be experimentally determined to obtain optimum segmentation results.

Geodesic vs. Geometric Distance

Figure 4A:
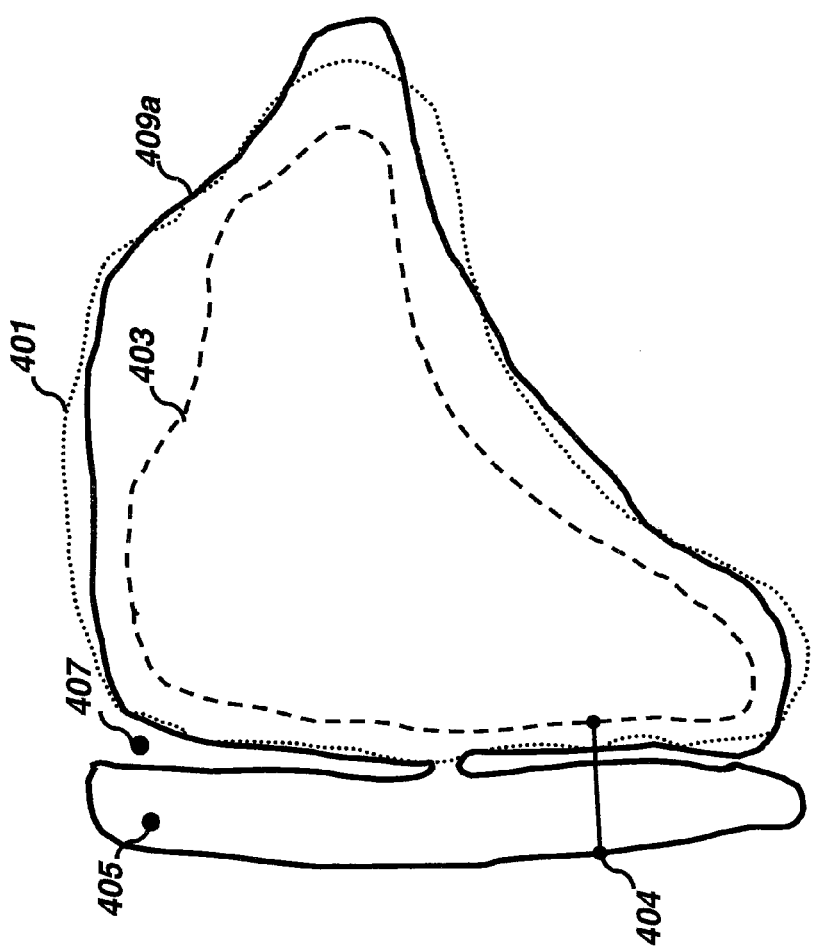
FIG. 4A is diagram showing an example segmentation map produced with a geometric distance criterion.

Embodiments of the present invention use geodesic distance rather than geometric distance, or Euclidian distance, as a criterion for region-growing a core region map 203 in order to produce an organ segmentation map. To illustrate the difference between a geometric and geodesic distance, refer to FIG. 4A. The dotted line indicated by item 401 represents the true boundary of the organ-of-interest. Item 403 represents a core region map while item 409a represents the corresponding organ segmentation map that would result if a geometric distance criteria were used within the region grower 250 of FIG. 2. Line 404 represents a geometric distance from the boundary of the core region map 403. Region 405, which is not part of the organ-of-interest, is included in the organ segmentation map 409a since the voxels in that region both satisfy the voxel range criterion and are within a geometric distance from the boundary of the core region map 403. Voxel region 407 corresponds to a region that is within the geometric distance of core region map 403 but has voxel values that are outside the intensity range indicated by the values $\Psi_H$ and $\Psi_L$.

Figure 4B:
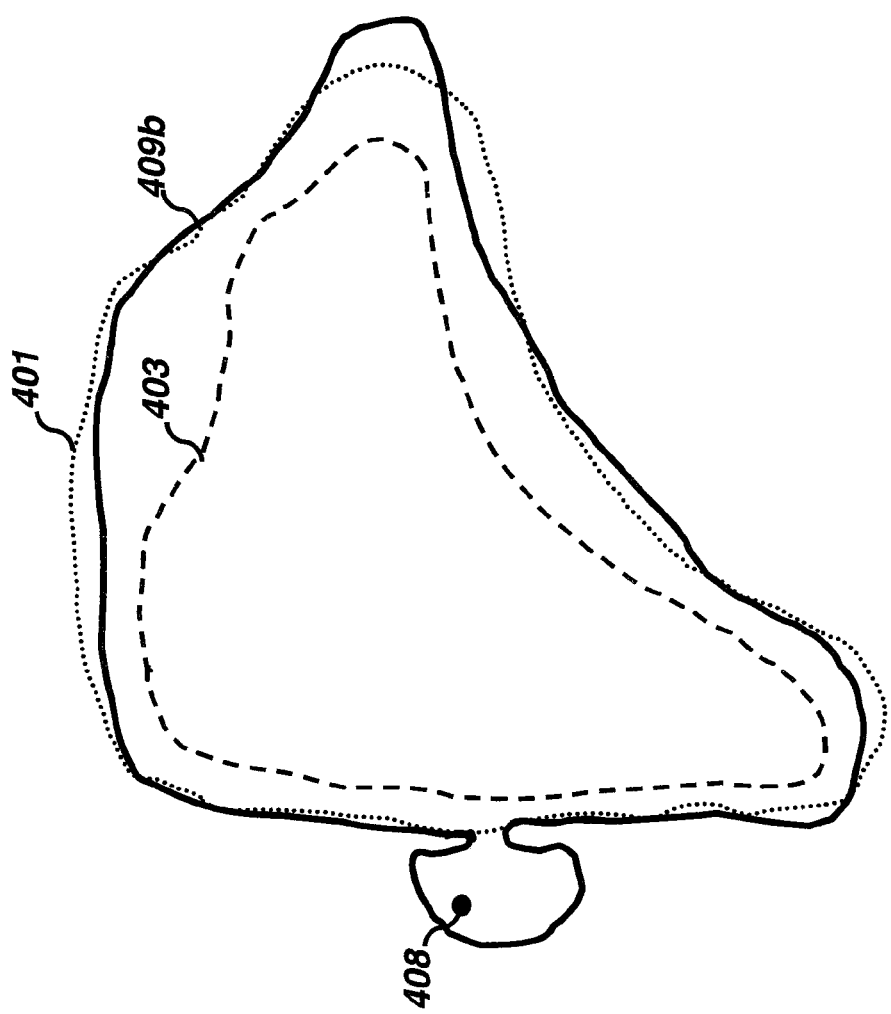
FIG. 4B is diagram showing an example segmentation map produced with a geodesic distance criterion.

In contrast, FIG. 4B shows processing of the same volume image data using a geodesic, or path length, distance. Starting with the same core region map 403, the corresponding organ segmentation map 409b is produced by region growing using the geodesic distance criterion. The dotted line indicated by boundary 401 again represents the true boundary of the organ-of-interest. Region 408 represents an error in segmentation, since that region corresponds to tissue that is not part of the organ-of-interest. However, region 408 shown in FIG. 4B represents a smaller error in segmentation than region 405 shown in FIG. 4A.

It is noted that the core region map 203, described with reference to FIG. 2, is calculated as a 3-dimensional quantity. The example core region map 303, shown in FIG. 3, is depicted as a 2-dimension closed curve for illustration purposes and represents the cross-sectional shape of a core region map in a plane, e.g. axial, coronal, sagittal, or any other arbitrarily oriented plane.

There are various ways that a distance criterion can be applied to a starting region map. For example, one embodiment of the present invention uses the method described by J. A. Sethian in *Level Set Methods and Fast Marching Methods*, Cambridge University Press, 1999. This includes initializing a fast-marching method with the boundary voxels of the core region map 203. A binary cost function is calculated as the threshold criterion defined by the parameters $\Psi_H$ and $\Psi_L$ as described above. As part of a binary cost function fast-marching method, new voxels are added to the initial region if they meet the cost function criterion. With each annex of voxels within the fast-marching method, the geodesic distance from the initial region is calculated. The region growing process stops when the calculated geodesic distance exceeds the constraint given by the specified propagation distance criterion $\Gamma$.

Figure 3:
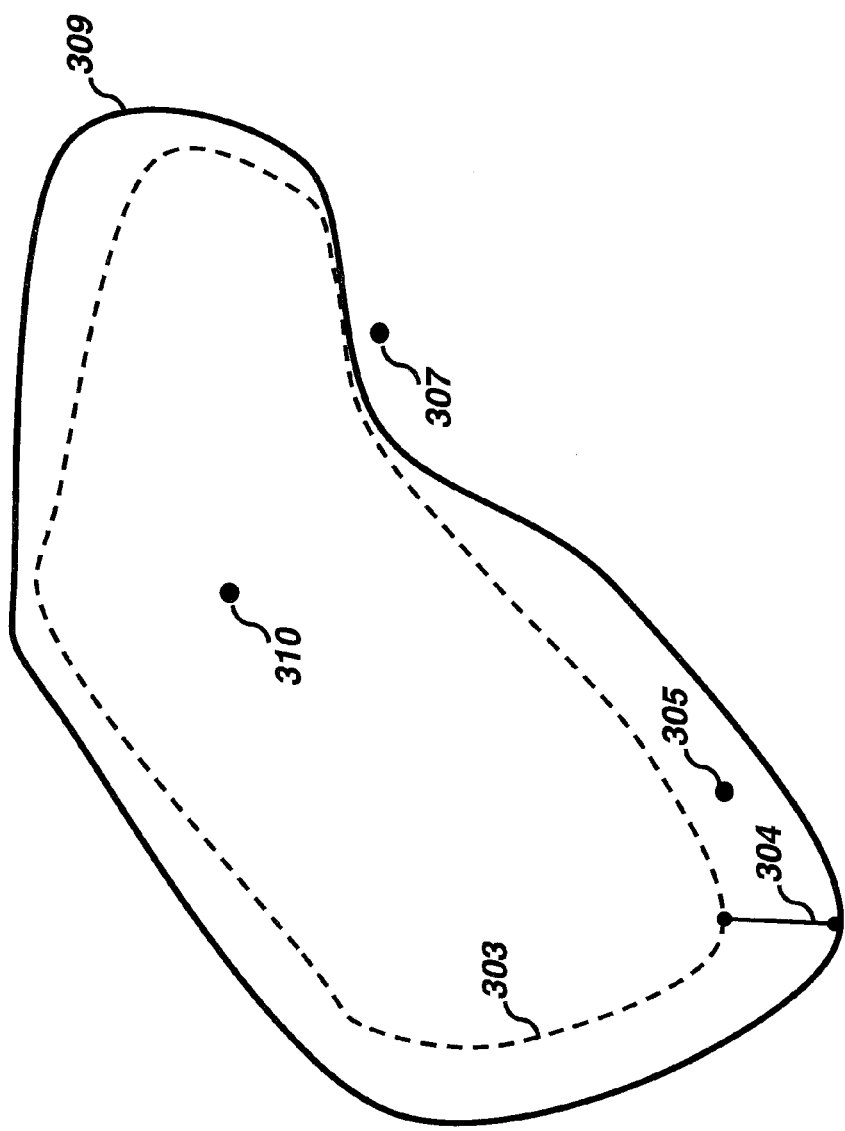
FIG. 3 is diagram showing an example segmentation map.

The core region map 203 of FIG. 2 and example core region map 303 shown in FIG. 3 are also segmentation maps and could be considered as candidates for an organ segmentation map 209. However, the present invention has been configured, for optimum results, to produce core region maps that tend to under-segment the organ-of-interest. That is, the typical core region map that is produced is intentionally somewhat smaller that the ideal region corresponding to the organ-of-interest. The region grower 250 is then used to enlarge the core region map in order to generate an expanded segmentation region using the two criteria:

(1) voxel value range as indicated by parameters $\Psi_H$ and $\Psi_L$; and (2) propagation distance from the boundary of the core region map as indicated by parameter $\Gamma$.

The region growing process is motivated by an analysis of the physical expression of voxel values corresponding to organs in the body. Some, but not all, organs in the body can be characterized as having a relatively homogeneous tissue radio-opacity at their core. However, the organ tissue often has less radio-opacity near the boundary of the organ for two reasons: (1) partial volume effects and (2) lower contrast uptake. For volume images where the patient is administered a contrast agent, the volume image will generally exhibit more radio-opacity (higher HU voxel values) in regions of tissue that have a correspondingly higher blood supply. The contrast agent is usually designed to be more radio-dense than water and blood. Consequently, at the boundary of the organ-of-interest there can be less contrast agent uptake.

In addition to this lowered intake effect, organs such as the liver often contact internal fluids along their boundaries. These internal fluids are usually less radio-dense than the solid tissues associated with the organ-of-interest. As a consequence, the voxel values at the boundary of an organ can be significantly lower due to partial volume effects. To help compensate for this, the parameter $\Omega_L$ is primarily set to a larger value than $\Omega_H$ to take advantage of the lower radio-opacity near the boundary of organs.

Multi-resolution Processing

The above described organ segmentation algorithm, outlined in FIG. 2, can be applied to a volume image of any dimension or resolution sampling. In one embodiment, the present invention applies the organ segmentation algorithm to different resolution levels of a Gaussian pyramid. This is accomplished by forming one or more lower resolution versions of the source volume image 201. Starting with the source volume image 201 a first lower resolution volume image is calculated wherein each voxel of the lower resolution volume image is calculated by averaging the voxel values from an N by N by M (xyz) block of voxels from the source volume image 201. The parameters N and M are chosen such that effective voxel dimensions, in physical units, of the first lower resolution volume image are as close to isotropic as can be obtained for integer values of N and M.

The above described organ segmentation algorithm is applied to the lower resolution volume image and a corresponding lower resolution organ segmentation map is produced. The XYZ dimensions and location of the lower resolution organ segmentation map within the corresponding lower resolution volume image are calculated. That is, the minimum and maximum values for the X, Y, and Z coordinates are calculated by analyzing the domain of voxels classified as organ voxels. These lower resolution minimum and maximum values for the X, Y, and Z coordinates are then interpolated up to the full resolution source volume image 201 in order to yield a volume-of-interest. This volume-of-interest represents a sub-volume, or set of voxels with the source volume image 201. Next the organ segmentation algorithm described above is applied to the voxels of the volume-of-interest.

Since the size of the volume-of-interest is smaller than the size of the entire source volume image 201, the overall processing time to calculate the organ segmentation map 209 is greatly reduced with processing at lower resolution. In general, the present invention works better on the full resolution image data than on the lower resolution image data. Therefore, since there can be errors in the segmentation processing, the dimensions of the volume-of-interest are expanded by approximately 20% to ensure that the organ-of-interest is bounded.

Figure 5:
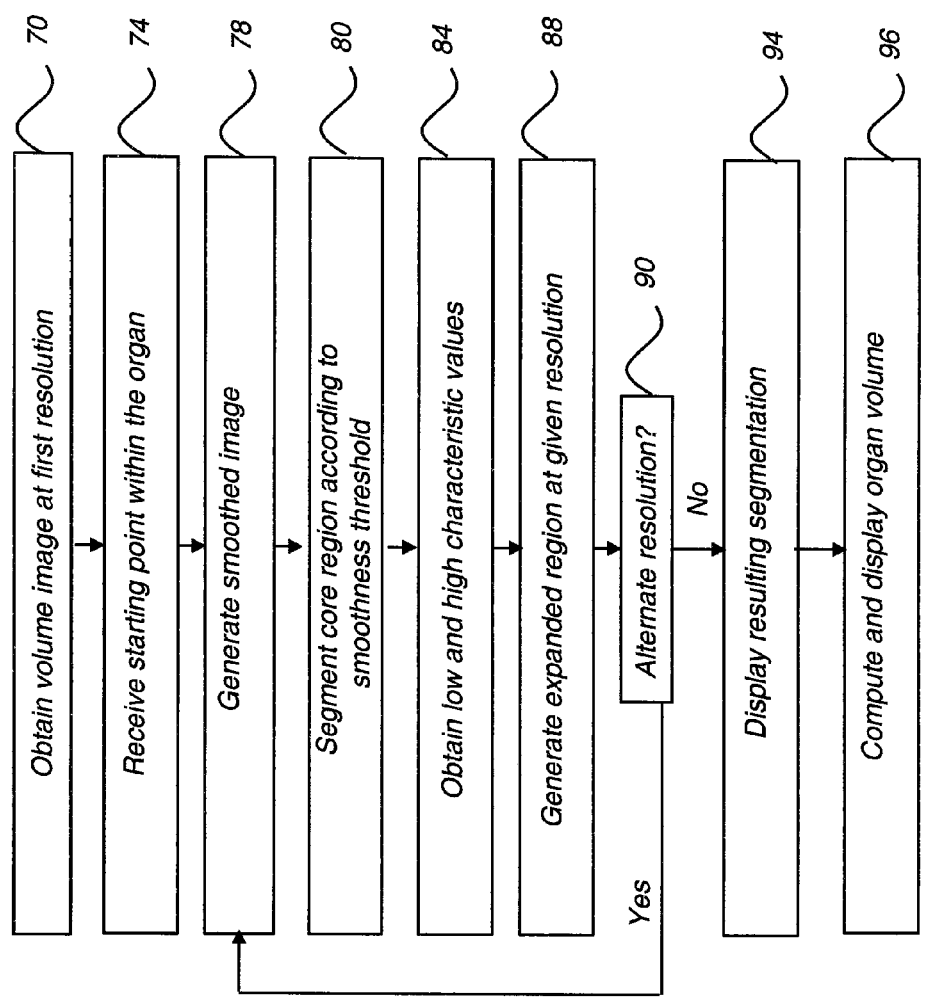
FIG. 5 is a logic flow diagram that shows processing steps used for volume image segmentation at one or more imaging resolutions.

The logic flow diagram of FIG. 5 shows how the processing steps of the present invention can be executed with the volume image generated at one or more different resolutions. The volume image is obtained, at a given resolution, in an obtain image step 70, optionally along with information related to the use of a contrast agent. In a receive starting point step 74, a seed point is identified, either by a practitioner or other user, or by another image processing system that provides this location as data. A human viewer may provide this starting point information as pixel or voxel coordinates using a mouse or other suitable on-screen pointer. A related image processing system may provide starting-point pixel or voxel coordinates as data, as a result of image analysis. In a generate smoothed image step 78, an image smoothing algorithm is applied to the image data, such as using iterative noise reduction algorithms as described previously, to generate smoothed image 202. Then, in a segment core region step 80, core region map 403 is generated. An obtain characteristic values step 84 computes the high characteristic value $\Psi_H$ and low characteristic value $\Psi_L$ that represent the range of voxel values corresponding to the organ-of-interest. Given core region map 403 and the high and low characteristic values $\Psi_H$ and $\Psi_L$, along with an empirically predetermined propagation distance parameter $\Gamma$, as noted previously, an expanded segmented region corresponding to organ segmentation map 209 is then generated and stored in a generate expanded region step 88. A looping step 90 tests to determine whether or not this processing takes place over multiple resolutions. If multiple resolutions are used, processing repeats from generate smoothed image step 78, using the alternate resolution image and the assigned seed point. After image processing at all desired resolutions is completed, results are compiled, combined, and stored, then displayed in a display results step 94. In one embodiment, the display provides an outline overlaid onto the volume image as displayed in 2-D form, as shown schematically in FIG. 3, or in 3-D form. In an alternate embodiment, the shape of the volume itself displays. It should be noted that data corresponding to the segmented region can be stored in computer-accessible memory in a number of ways, such as by storing coordinates of voxels lying along the periphery of the segmented region, for example.

A compute and display organ volume step 96 then computes and displays the organ volume using the segmentation information that has been generated and stored in memory. Both data corresponding to the segmented region and the computed volume can be stored in memory and provided as data to another computer or processor. As noted previously, one of the main reasons for segmenting an organ in a 3-dimensional image is to calculate the size of the organ. Embodiments of the present invention calculate the size of the organ of interest by determining the number of voxels included in the final segmentation region and multiplying that number by the volume of a single voxel, as specified by voxel spacing data stored with the volume image.

In one embodiment, obtain image step 70 in the sequence of FIG. 5 includes obtaining contrast agent data for the patient. In this embodiment, whether or not the patient has received a contrast agent is ascertained. If not, image processing can proceed, with suitably adjusted variables for improved performance where no contrast agent has been used. If so, factors such as type of contrast agent, amount of time since ingestion, patient size and weight, and other factors may also influence the values of various thresholds and parameters used in segmentation processing, such as for spatial filtering for noise compensation, for example.

Although the technology described herein has been described primarily with reference to volumetric CT images for segmenting liver organs, those skilled in the art will appreciate that the general processes described herein can be used to segment other organs in a body including, but not limited to the spleen, gall bladder, and heart. In addition, those skilled in the art will recognize that the present invention can be used with CT or other volume images from various imaging modalities, such as MR volumetric images. The voxel values of volumetric MR images are different from the Hounsfield units (HU) used in CT volumetric images. However, the tissue of organs-of-interest still can be differentiated from background tissue in volumetric MR images. The seed point that is used as a starting point is typically indicated by the radiologist or other viewer, but may be automatically generated.

Those skilled in the art will recognize that there are many different algorithms that can be used to calculate a geodesic distance map or a cost function variant of geodesic distance map that can be used in the present invention.

Those skilled in the art will recognize that the level set method approach described by J. A. Sethian in the text cited previously can also be used with the present invention. The level set method provides a many-at-once wave-front surface progression method that can incorporate more mathematically complex cost-functions (with a corresponding increase in required computational resources).

Although the technology described herein was developed and tested with volumetric images of human patients, those skilled in the art will recognize that the present invention is also applicable to volumetric images of mammalian and other animals.

Although the present invention was primarily motivated by a 3-dimensional medical digital imaging application, those skilled in the art will recognize that the technology described herein is applicable to 2-dimensional image analysis applications as well. Most region growing techniques, and the Fast Marching technique in particular, have a corresponding 2-dimensional embodiment. For example, the above 3-dimensional technology can also be applied to a single CT slice, i.e., a 2-dimensional entity.

The image processing operations given in the description above can be implemented and stored as a computer program stored in a computer readable storage medium. The computer readable storage medium can include, for example: magnetic storage media such as a magnetic disk or magnetic tape; optical storage media such as an optical disc, optical tape, or machine readable bar code; solid state electronic storage devices such as random access memory (RAM), or read only memory (ROM). The associated computer program implementation of the present invention can also be stored on any other physical device or medium employed to store a computer program. It is also possible to implement software functions of the present invention using one or more electronic circuits.

The invention has been described in detail with particular reference to certain preferred embodiments thereof, but it will be understood that variations and modifications can be effected within the spirit and scope of the invention.

The invention claimed is:

1. A method for obtaining a segmented region corresponding to an anatomical organ in a volume image, comprising:
   generating a smoothed image from the volume image;
   forming a core segmentation of the volume image according to the smoothed image;
   increasing the size of the core segmentation of the volume image to form the segmented region for the anatomical organ according to data obtained from the core segmentation, wherein increasing the size of the core segmentation comprises obtaining a low characteristic value and a high characteristic value from the core segmentation; and
   storing data corresponding to the segmented region in a memory.

2. The method of claim 1 further comprising receiving a starting point within the volume image wherein the starting point corresponds to a location within the anatomical organ.

3. The method of claim 1 wherein generating the smoothed image comprises spatially filtering the volume image.

4. The method of claim 1 wherein increasing the size of the core segmentation further comprises constraining the increase to within a predetermined propagation distance from the boundary of the core region.

5. The method of claim 1 further comprising estimating noise magnitude in the volume image data and using the estimate of noise magnitude to generate the smoothed image.

6. The method of claim 1 wherein the memory is a display buffer.

7. A method of segmenting a region corresponding to an anatomical organ of interest in a volume image, the method comprising:
   receiving a starting point within the volume image and corresponding to a location within the anatomical organ;
   generating a smoothed image by spatially filtering the volume image;
   segmenting a core region within the smoothed image based on a predetermined smoothness threshold criterion, wherein the core region includes the starting point;
   obtaining a low characteristic value and a high characteristic value according to the range of values within the core region;
   generating an expanded segmented region corresponding to the anatomical organ of interest by expanding the core region according to voxel values within the range defined by the obtained low and high characteristic values; and
   presenting the expanded segmented region of the anatomical organ of interest on a display.

8. The method of claim 7 further comprising estimating noise magnitude in the volume image data and using the estimate of noise magnitude to generate the smoothed image.

9. The method of claim 7 wherein expanding the core region is constrained to within a predetermined propagation distance from the boundary of the core region.

10. The method of claim 9 wherein the propagation distance is a geodesic distance.

11. The method of claim 7 wherein receiving the starting point comprises accepting an on-screen operator entry.

12. The method of claim 7 wherein receiving the starting point comprises receiving data from a computer system.

13. The method of claim 7 further comprising computing a volume of the organ of interest according to dimensions of the expanded segmented region and displaying the computed volume.

14. The method of claim 7 wherein spatially filtering the volume image is performed by filtering 2-D image slices that are used to generate the volume image.

15. The method of claim 7 wherein spatial filtering is an iterative operation, with processing steps repeated two or more times.

16. The method of claim 7 further comprising forming one or more versions of the volume image at different resolutions.

17. The method of claim 16 wherein generating an expanded segmented region comprises combining the one or more versions of the volume image at different resolutions.

18. The method of claim 7 wherein the organ of interest is taken from the group consisting of a liver, a kidney, a gall bladder, a stomach, and a heart.

19. The method of claim 7 wherein segmenting the core region further comprises relocating the starting point.

* * * * *